United States Patent
Kannell

(10) Patent No.: US 8,041,307 B2
(45) Date of Patent: Oct. 18, 2011

(54) METHOD OF CONTROLLING WIRELESS COMMUNICATIONS

(75) Inventor: George K. Kannell, Florham Park, NJ (US)

(73) Assignee: Alcatel Lucent, Paris (FR)

( * ) Notice: Subject to any disclaimer, the term of this patent is extended or adjusted under 35 U.S.C. 154(b) by 692 days.

(21) Appl. No.: 11/966,377

(22) Filed: Dec. 28, 2007

(65) Prior Publication Data

US 2009/0170422 A1    Jul. 2, 2009

(51) Int. Cl.
*H04B 1/00* (2006.01)
*H04B 7/00* (2006.01)
(52) U.S. Cl. .................... 455/68; 455/410; 455/411
(58) Field of Classification Search ............. 455/1, 68, 455/410, 411
See application file for complete search history.

(56) References Cited

U.S. PATENT DOCUMENTS

| | | | |
|---|---|---|---|
| 5,822,429 A * | 10/1998 | Casabona et al. | 380/252 |
| 7,257,099 B2 * | 8/2007 | Myojo | 370/329 |
| 2005/0020244 A1 * | 1/2005 | Chang et al. | 455/410 |

FOREIGN PATENT DOCUMENTS

| | | |
|---|---|---|
| WO | 9856192 | 12/1998 |
| WO | 2006039936 A1 | 4/2006 |
| WO | 2007073269 A1 | 6/2007 |

OTHER PUBLICATIONS

International Search Report and Written Opinion of the International Searching Authority for International application No. PCT/US2008/013750 mailed Apr. 3, 2009.

* cited by examiner

*Primary Examiner* — Tuan H Nguyen
(74) *Attorney, Agent, or Firm* — Carlson, Gaskey & Olds PC

(57) ABSTRACT

An exemplary method of controlling wireless communications includes generating a control signal that indicates a desired transmission timing of a plurality of interference signals from a respective plurality of interference devices. The control signal is transmitted to the plurality of interference devices.

20 Claims, 1 Drawing Sheet

METHOD OF CONTROLLING WIRELESS COMMUNICATIONS

FIELD OF THE INVENTION

This invention generally relates to communication. More particularly, this invention relates to wireless communications.

DESCRIPTION OF THE RELATED ART

Wireless communication systems are well known and in widespread use. Personal wireless communication devices such as cellular phones, personal digital assistants and notebook computers provide convenient communication abilities under a wide variety of circumstances. There are instances, however, in which it is desirable to limit an individual's ability to use such a communication device. For example, in some hospital settings, it is desirable to prevent an individual from conducting wireless communications within a certain proximity of hospital equipment so that the personal wireless communications will not interfere with the desired operation of the hospital equipment. Another example scenario is in an entertainment venue such as a theater. It may be desirable to prevent wireless communication devices from operating during a performance, for example.

There are known techniques for generating interference signals that have the effect of interfering with an ability of a communication device to conduct wireless communications. One limitation on known interference techniques is that they are not customized to selectively interfere with some communications but not others. For example, within a given area certain individuals or devices may be authorized or required to conduct wireless communications while in that same area it is desirable to present other devices from conducting wireless communications. It would be useful to control interference signals in a manner that selectively allows particular or authorized individuals or devices to continue to have an ability to conduct wireless communications even though such a device is within a coverage area of one or more interference signals.

SUMMARY

An exemplary method of controlling wireless communications includes generating a control signal that indicates a desired transmission timing of a plurality of interference signals from a respective plurality of interference devices. The control signal is transmitted to the plurality of interference devices.

An exemplary system for controlling wireless communications includes a plurality of interference devices that each transmit an interference signal. A controller provides a control signal to the plurality of interference devices. The control signal indicates a desired transmission timing of the interference signals.

The interference devices transmit the interference signals according to the desired transmission timing of the control signal. The interference signals in one example are configured to interfere with at least an ability of a communication device to conduct wireless communications.

The various features and advantages of the disclosed example will become apparent to those skilled in the art from the following detailed description. The drawings that accompany the detailed description can be briefly described as follows.

DETAILED DESCRIPTION

Figure 1:
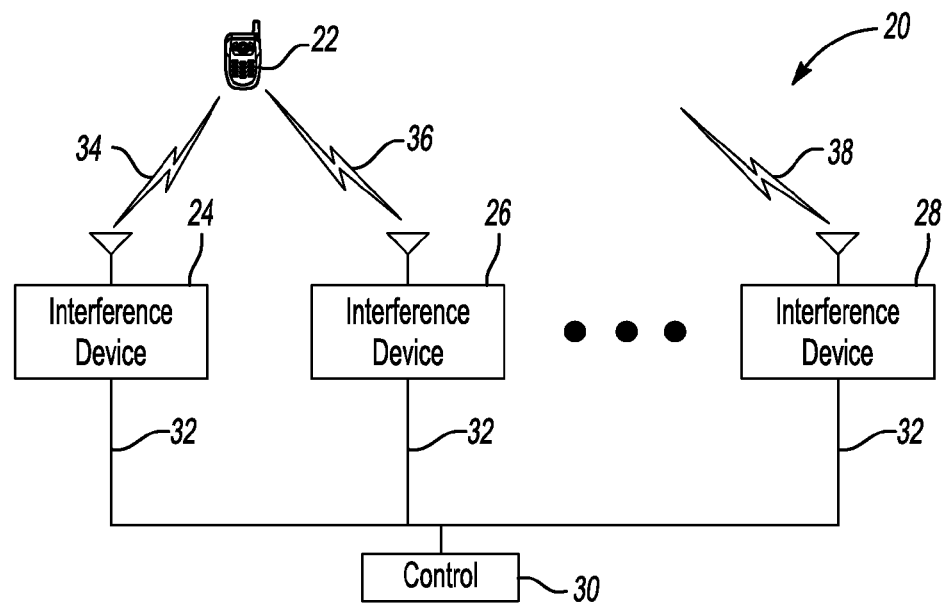
FIG. 1 schematically illustrates selected portions of a wireless communication system.

FIG. 1 schematically shows selected portions of a wireless communication system 20 that is useful for controlling wireless communications. In this example, a wireless communication device 22 is within an area where at least selected restrictions on wireless communications are in place. A plurality of interference devices 24, 26 and 28 are strategically arranged to cause interference within a selected area to prevent or selectively limit an ability of the wireless communication device 22 to conduct wireless communications.

The example of FIG. 1 includes a controller 30 that generates a control signal 32 provided to each of the interference devices 24-28. The control signal 32 indicates a desired transmission timing of the interference signals 34, 36 and 38 of the respective interference devices 24-28. The desired transmission timing schedules the transmission of the interference signals 34-38. In one example, the desired transmission timing schedules the transmission of the interference signals at different times, respectively. In another example, all of the interference signals are scheduled for simultaneous transmission.

Figure 2:
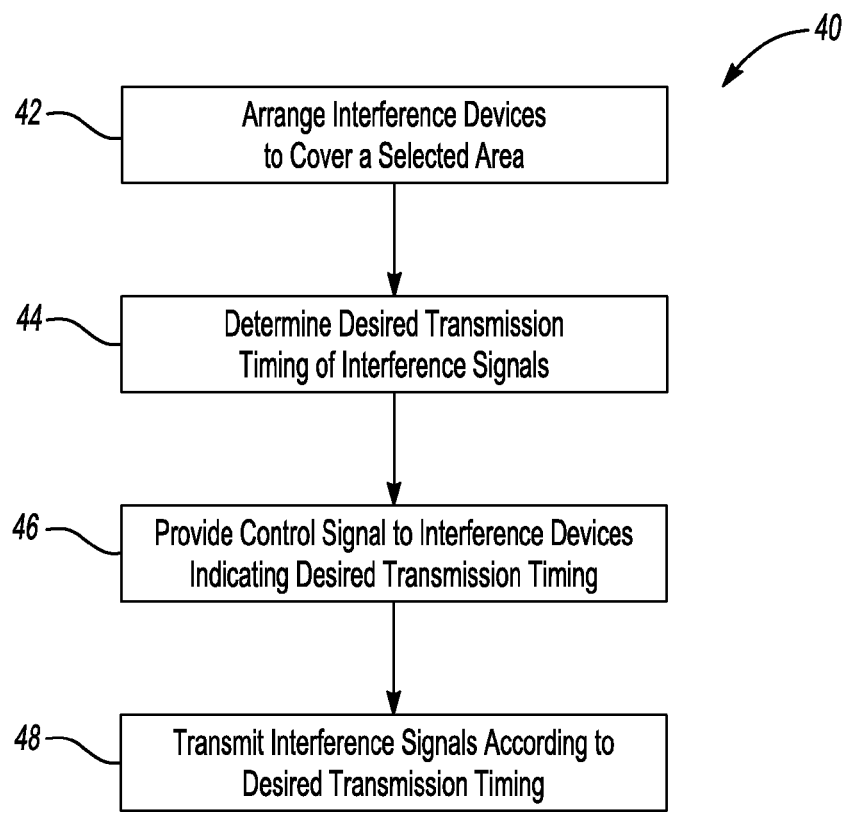
FIG. 2 is a flowchart diagram summarizing one example approach.

FIG. 2 includes a flowchart diagram 40 summarizing one example approach. In this example, the interference devices 24-28 are arranged to cover a selected area at 42. A desired transmission timing of the interference signals is determined at 44. The control signal is provided at 46 to the interference devices indicating the desired transmission timing. At 48, the interference devices transmit their respective interference signals according to the desired transmission timing.

In one example, the interference signals 34-38 are coded signals such that a receiving device could decipher the associated code. One example includes using spread spectrum coding such as pulsed or pseudo noise (PN) code modulation for the interference signals 34-38. In such an example, the desired transmission timing indication ensures that the codes are decipherable by a device receiving the interference signals.

This feature is useful in situations where it is desirable to allow at least one individual or device within an area covered by one or more of the interference signals 34-38 to conduct wireless communications even in the presence of the interference signals. For example, an authorized device will have an ability to decipher a code of the interference signals and to effectively cancel out the interference effect of the interference signal as a result of having properly deciphered the interference signal.

Controlling the timing of the transmissions of the signals ensures that the codes do not overlap or otherwise interfere with each other such that the code would not be decipherable by such an authorized device. Selectively scheduling the transmission of the interference signals from the interference devices 24-28 ensures that the code of the interference signals is decipherable, which avoids undesirably disabling or interfering with an ability of an authorized communication device to conduct wireless communications even in the presence of the interference signals 34-38.

For example, a receiver receiving one or more of the interference signals 34-38 may include a rake receiver configured to process the received interference signal to electronically cancel the coded interference signal, which would allow the receiver to operate normally and be immune to the interference.

The disclosed example is useful for controlling wireless communications in selected areas where only authorized communications are desired. The disclosed examples are useful, for example, to allow emergency 911 calls while interfering with other calls being made under selected circumstances. Another example use of the disclosed method is to facilitate use of a directional radio for locating an offending receiver that is operating in an unauthorized manner or in an unauthorized location, for example. The controlled transmission timing of the interference signals allows for preventing the interference signals from interfering with the operation of the locating radio in such an example. Other example scenarios include limiting wireless communications in hospitals, theaters or other locations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of controlling wireless communications, comprising the steps of:
    generating a control signal that indicates a desired transmission timing of a plurality of interference signals from a respective plurality of interference devices, the desired transmission timing scheduling the interference signal transmission from each of the interference devices with a timing that avoids mutual interference between the interference signals to allow at least one receiver device to be able to cancel an effect of each interference signal; and
    transmitting the control signal to the plurality of interference devices.

2. The method of claim 1, wherein the desired transmission timing prevents the plurality of interference signals from interfering with each other.

3. The method of claim 1, wherein the interference signals are coded and the desired transmission timing controls any mutual interference between the interference signals to be sufficiently low enough to allow the least one receiver device to decipher a code of each interference signal and to use the deciphered code for cancelling the effect of each interference signal.

4. The method of claim 1, wherein the desired transmission timing schedules the interference signal transmissions at different times, respectively.

5. The method of claim 1, comprising:
    receiving the control signal at each of the interference devices; and
    transmitting the interference signals according to the desired transmission timing of the received control signal.

6. The method of claim 1, comprising
    coding the interference signals using the same code for all of the interference signals.

7. The method of claim 1, comprising
    coding the interference signals using a code that is decipherable by at least one device receiving at least one of the interference signals.

8. The method of claim 1, wherein the interference signals are configured to interfere with at least an ability of a communication device to conduct wireless communications.

9. A method of controlling wireless communications, comprising the steps of:
    generating a control signal that indicates a desired transmission timing of a plurality of interference signals from a respective plurality of interference devices wherein the desired transmission timing schedules at least some of the interference signal transmissions simultaneously; and
    transmitting the control signal to the plurality of interference devices.

10. The method of claim 9, wherein the desired transmission timing schedules all of the interference signal transmissions simultaneously.

11. A system for controlling wireless communications, comprising:
    a plurality of interference devices that each transmit an interference signal; and
    a controller that provides a control signal to the plurality of interference devices, the control signal indicating a desired transmission timing of the interference signals, the desired transmission timing scheduling the plurality of interference signals to avoid mutual interference between the interference signals to allow at least one receiver to cancel an effect of each interference signal.

12. The system of claim 11, wherein the interference devices transmit the interference signals according to the desired transmission timing of the control signal.

13. The system of claim 11, wherein the desired transmission timing prevents the plurality of interference signals from interfering with each other.

14. The system of claim 13, wherein the interference signals are coded and the desired transmission timing controls any mutual interference between the interference signals to be sufficiently low enough to allow the least one receiver device to decipher a code of each interference signal and to use the deciphered code for cancelling the effect of each interference signal.

15. The system of claim 11, wherein the desired transmission timing schedules the interference signal transmissions at different times, respectively.

16. The system of claim 11, wherein the interference signals are coded and the interference devices all use the same code.

17. The system of claim 11, wherein the interference signals are coded using a code that is decipherable by a communication device receiving at least one of the interference signals.

18. The system of claim 11, wherein the interference signals are configured to interfere with at least an ability of a communication device to conduct wireless communications.

19. A system for controlling wireless communications, comprising:
    a plurality of interference devices that each transmit an interference signal; and
    a controller that provides a control signal to the plurality of interference devices, the control signal indicating a desired transmission timing of the interference signals wherein the desired transmission timing schedules at least some of the interference signal transmissions simultaneously.

20. The system of claim 19, wherein the desired transmission timing schedules all of the interference signal transmissions simultaneously.

* * * * *